United States Patent [19]

Doi et al.

[11] Patent Number: 4,548,992

[45] Date of Patent: Oct. 22, 1985

[54] TWO-PART TYPE ADHESIVES

[75] Inventors: Hidemi Doi; Takanori Okamoto; Hideaki Matsuda, all of Kagawa, Japan

[73] Assignee: Okura Koygo Kabushiki Kisha, Japan

[21] Appl. No.: 632,212

[22] Filed: Jul. 18, 1984

Related U.S. Application Data

[63] Continuation of Ser. No. 423,449, Sep. 24, 1982, abandoned.

[30] Foreign Application Priority Data

Dec. 5, 1981 [JP] Japan .............................. 56-195123

[51] Int. Cl.[4] .......................... C08L 9/02; C08L 67/06
[52] U.S. Cl. ..................................... 525/167; 525/169; 525/171; 525/919; 525/939; 523/526
[58] Field of Search ............... 525/167, 169, 171, 919, 525/939; 523/526

[56] References Cited

U.S. PATENT DOCUMENTS

| | | | |
|---|---|---|---|
| 3,136,681 | 6/1964 | Johnston | 525/169 |
| 3,718,714 | 2/1973 | Comstock | 525/170 |
| 4,160,758 | 7/1979 | Gardner | 523/526 |
| 4,336,344 | 6/1982 | Craigie | 525/31 |

OTHER PUBLICATIONS

Bjorksten, *Polyesters and their Applications*, Reinhold Publishing, 1956, p. 64.

*Primary Examiner*—John C. Bleutge
*Assistant Examiner*—Patricia Short
*Attorney, Agent, or Firm*—Jacobs & Jacobs

[57] ABSTRACT

There is provided a novel acrylic two-part adhesive suitable for structural uses composed of a liquid I comprising an acrylic monomer and an organic peroxide and a liquid II comprising an acrylic monomer and a curing accelerator. At least one of the liquid I and II further contains a diene-elastomer, and the liquid I or both the liquids further contain an ion-containing unsaturated polyester. The unsaturated polyester is further characterized in that it has one or more polymerizable or copolymerizable double bonds and its remaining carboxylic group is neutralized with a metal compound, ammonia or an amine.

10 Claims, No Drawings

TWO-PART TYPE ADHESIVES

CROSS-REFERENCE

This is a continuation of Ser. No. 423,449 filed Sep. 24, 1982, now abandoned.

BACKGROUND OF THE INVENTION

This invention relates to a novel acrylic two-part type adhesive suitable for structural uses having excellent storage stabilities and adhesion performances.

Hitherto as acrylic adhesives have been known anaerobic adhesives, cyanoacrylate adhesives and the like. They are characterized by exhibiting adhesion in a short time and exhibiting a strong tensile strength although they are of one-pack type, while they are very weak against some strengths applied such as tearing and impact. Thus, their uses are restricted to the fixing of fitted portions or the like in the case of the anaerobic adhesives and to temporary fixing or the like in the case of the cyanoacrylate adhesives.

On the other hand, acrylic two-part adhesives wherein an elastomer such as acrylic rubber or epichlorohydrin rubber was dissolved in an acrylic monomer such as methyl methacrylate have been known (sometimes referred to as the first-generation acrylic adhesives). The adhesives of this type, however, do not undergo in a curing step a chemical reaction between the monomer and the elastomer, wherein the fragility caused by the acrylic monomer alone has been simply improved by the presence of the elastomer. Moreover, they exhibit good working performance but are considerably inferrior in adhesion performances, in comparison with the epoxy adhesives which are now used for structural uses in the greatest quantities.

Recently have been developed acrylic two-part adhesives called "the second-generation acrylic adhesives". In these adhesives, a chlorosulfonated polyethylene is often used as the elastomer component. The adhesives are characterized by such a mechanism that radicals are produced on the side chains of the elastomer in the course of curing and polymerizable monomers are graft-polymerized thereto. Thus, the adhesives have excellent adhesion properties in comprison with the first-generation adhesives which do not involve such a graft polymerization. More specifically, the adhesives have the tensile shear strength and impact strength equivalent or even superior to those of the epoxy adhesives, and also exhibit far better values with respect to the tear strength, fatigue strength and oily surface adhesion properties than the epoxy adhesives.

As to the working performances, the second-generation adhesives (as well as the first-generation adhesives) are advantageous in that they do not require troublesome operations such as weighing and mixing which are required in the case of the epoxy adhesives. In this respect, the acrylic adhesives of this type may be said to be an excellent adhesive. However, when they are used to bond metal articles, the adhesive containing chlorosulfonated polyethylene as the elastomer is dechlorinated after long term storage or upon heating at a high temperature and the resulting chlorine often corrodes the bonded metal surfaces to lower the adhesion strength. Thus, a small amount of an absorbent for the decomposed chlorine such as epoxy resins has been incorporated to stabilize the adhesive, but a satisfactory effect can not be exhibited. Moreover, a second-generation adhesive wherein a diene-elastomer was used has been developed, but this adhesive is also not satisfactory with respect to its adhesion performances and storage stability.

The present inventors have been engaged in the researches on curable compounds having ionic bonds, and invented one-pack anaerobic adhesives having excellent properties. Such adhesives include, for example, a rapidly curing anaerobic adhesive comprising an anaerobic mixture base of a polyvalent metal salt of an acid

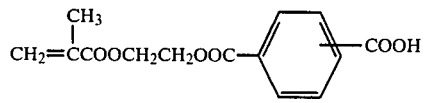

and an acrylate or methacrylate ester and a small amount of an organic acid adduct of an amine and organic peroxide (cf. Japanese Patent Publication No. 47492/1977); and a one-pack anaerobic adhesive, which is rapidly curable and can be strongly bonded to a metal other than iron and copper without a primer, comprising the above-mention anaerobic mixture base and o-benzsulfimide, tetrahydroquinoline and an organic peroxide (cf. Japanese Patent Publication No. 477766/1977).

After intensive researches, the present inventors have accomplished a novel adhesive of the second-generation acrylic type which is suitable for structural uses and excellent in storage stability and adhesion performances.

SUMMARY OF THE INVENTION

Thus there is provided a novel two-part type adhesive composed of a liquid I comprising an acrylic monomer and an organic peroxide and a liquid II comprising an acrylic monomer and a curing accelerator, characterized in that at least one of the liquids I and II contains a dieneelastomer, and an ion-containing unsaturated polyester composed of an unsaturated polyester represented by the general formula, $$+OCHCH_2OCR'C+_n$$
$$\phantom{+OCHCH_2}|\phantom{OC}\|\phantom{R}\|$$
$$\phantom{+OCHCH_2}R\phantom{OCR'}O\phantom{}O$$

(wherein R is hydrogen, alkyl of 1 or 2 carbon atoms,

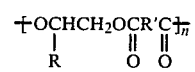—OCH$_2$—, CH$_2$=CCOOCH$_2$—, or $$CH_2=CHCH_2OCH_2-;$$

R' is a dibasic acid residue; and n is an integer of 4 to 20; at least one of said R and R' having a polymerizable or copolymerizable double bond) the remaining carboxyl group of which is neutralized with an alkali metal compound, ammonia, an amine or a mixture thereof, is incorporated in said liquid I or both said liquid I and said liquid II in an amount of 0.2 to 30% by weight of the total amount of said liquid I and liquid II.

DETAILED DESCRIPTION OF THE INVENTION

The ion-containing unsaturated polyester to be used in the present invention which has one or more polymerizable or copolymerizable double bonds in its molecule and the remaining carboxyl group of which is neutralized with a metal compound ammonia or an amine, can be chemically bonded with the diene-elastomer via the double bond in its molecule in the course of curing reaction. Moreover, the resulting cured system has ionic bonds. It is considered that the present adhesive can exhibit very excellent adhesion strengths due to the above-described features. The ionic bond can enhance the affinity between the adhesive and an oil-deposited metal surface to increase the oily surface-adhesion property and also enhance the storage stability of the adhesive itself.

Thus in the present invention, it has been found that the novel adhesive of the second-generation type is obtained which exhibits excellent performances, due to the mechanisms different from the conventional adhesives, by the action of the neutralized ion-containing unsaturated polyester contained therein.

The advantageous features obtained by the present adhesive are summarized in comparison with the conventional adhesives in the following: (1) The present adhesive has good thermal resistance and the product bonded therewith is not deteriorated for a long period of time, because chlorosulfonated polyethylene is not used therein. (2) Excellent in the oily surface adhesion property. (3) Excellent in adhesion strengths in comparison with the adhesive wherein the diene-elastomer was used alone. (4) Very excellent in the storage stability.

The acrylic monomers to be used in the present invention include, for example, an alkyl methacrylate or acrylate such as methyl methacrylate, ethyl methacrylate, propyl methacrylate, butyl methacrylate, cyclohexyl methacrylate, and tetrahydrofurfuryl methacrylate; a hydroxyalkyl methacrylate or acrylate such as 2-hydroxyethyl methacrylate and 2-hydroxypropyl methacrylate; a polymethacrylate or polyacrylate of a polyhydric alcohol; an epoxy polymethacrylate or polyacrylate; a urethane polymethacrylate or polyacrylate; a polyester polymethacrylate or polyacrylate, and the like; and mixtures thereof. These monomers can be used alone or as mixtures. The suitable amount to be used is in the range of 40% to 90% by weight in each of the liquids I and II.

The mixed monomer system consisting of an alkyl methacrylate of which the alkyl group has 1 to 3 carbon atoms and a hydroxyalkyl methacrylate of which the alkyl group has 2 to 4 carbon atoms is especially good in respect of the adhesion performances. If desired, it is preferred to add a suitable amount of the above-mentioned polyfunctional methacrylate to the mixed monomer system for improving the heat stability and resistance to water of the adhesive. Also it is possible to add a very small amount of methacrylic acid or acrylic acid to improve the adhesion property.

The organic peroxides to be used include, for example, a hydroperoxide such as t-butyl hydroperoxide, p-menthane hydroperoxide, cumene hydroperoxide, and di-isopropylbenzene hydroperoxide; a dialkyl peroxide such as di-t-butyl peroxide, 2,5-dimethyl-2,5-di(t-butyl peroxy)hexane, and dicumyl peroxide; an acyl peroxide such as lauroyl peroxide and benzoyl peroxide; a ketone peroxide such as methyl ethyl ketone peroxide; and the like. The amount to be used is generally 0.5 to 20% and preferably 1 to 10% by weight of the liquids I and II.

As the curing accelerator can be used the conventional compounds which can decompose the organic peroxides via redox reaction; which include a metal chelate compounds such as vanadyl acetyl acetonate and cobalt acetyl acetonate, metal soaps such as manganese naphthenate and cobalt naphthenate, and sulfur-containing compounds such as dibutyl thiourea and ethylene thiourea, as described for example in H. Takiyama "Polyester Jushi" p.p. 86 to 87, Nikkan Kogyo Shinbunsha, Japan. These accelerators may be used alone or in mixtures. The amount to be used is generally 0.05 to 10% and preferably 0.2 to 5% by weight of the liquids I and II.

The diene-elastomers to be contained in at least one of the liquids I and II include, for example, styrene butadiene rubber (SBR), polybutadiene rubber (BR), polyisoprene rubber (IR), nitrile rubber (NBR) and the like. The amount to be used is generally 2 to 50% and preferably 5 to 30% by weight of the liquid I or II. Nitrile rubber (NBR) is especially preferred because it has large polarity and exhibits good solubility and adhesion.

It is to be noted that an elastomer containing chlorosulfone groups and a saturated elastomer having no double bond in its molecule are excluded in the present invention from the viewpoint of the deterioration and copolymerization property as described above.

The ion-containing unsaturated polyester which has one or more polymerizable or copolymerizable double bonds in its molecule and of which the remaining carboxylic group is neutralized with a metal compound, ammonia or an amine, to be used in the present invention, can be prepared by any conventional method.

A suitable method for preparation of the polyester is shown in the following. As the materials are used a dihydric alcohol such as ethylene glycol, propylene glycol and diethylene glycol; a saturated or unsaturated dibasic acid anhydride such as maleic anhydride, phthalic anhydride, succinic anhydride, tetrahydrophthalic anhydride, and tetrahydrophthalic anhydride; and a saturated or unsaturated monoepoxy compound such as propylene oxide, butylene oxide, phenyl glycidyl ether, allyl glycidyl ether, glycidyl methacrylate and glycidyl acrylate. These materials are charged in such quantities that at least one unsaturated bond is formed in the molecule of the resulting product and are subjected to addition polymerization reaction. Thus, the unsaturated polyester can be readily obtained. The suitable acid value of the resulting unsaturated polyester is in the range of about 5 to 40. Then, the remaining carboxyl group of the polyester is neutralized with a metal compound, ammonia or an amine to obtain the aimed polyester to be used in the present invention.

Incidentally, in the above-mentioned preparation of the unsaturated polyester by way of the addition polymerization reaction, the present inventors conducted the addition polymerization reaction in the presence of the abovementioned neutralizer, i.e., the metal compound, ammonia or amine. It has been found that the neutralizer compound forms a salt with the carboxylic group in the course of the reaction, is dissolved homogeneously in the reaction system and acts as a catalyst for the addition reaction to markedly shorten the reaction time, as well as gives rise to the neutralization reaction simultaneously. Thus, the aimed polyester can be obtained in one step and in a short period without the separate neutralization step.

It is considered that the resulting neutralized ioncontaining unsaturated polyester is copolymerized or graftpolymerized with the elastomer and acrylic monomer, whereby the strong adhesion properties can be exhibited.

This is clearly supported by the fact that the use of a saturated polyester having no unsaturated bond in its molecule results in markedly inferior adhesion performances, in comparison with the case where the ion-containing polyester having an unsaturated bond is used according to the invention.

Moreover, the metal-, ammononium- or amine-salt of the remaining carboxyl group acts as a strong gelling stabilizer and also acts to enhance the oily surface-adhesion property in the present invention.

In general, two-part acrylic adhesives have poor storage stability in comparison with anaerobic adhesives, because the acrylic adhesive contains a large amount of an acrylic monomer which is not so anaerobic. The present inventors have confirmed that when the acrylic adhesive is caused to coexist with an elastomer, these two components are very readily gelled. Thus, the two-part acrylic adhesives now on the market have a shorter shelf life than the anaerobic adhesives and also have problems with respect to the storage stability after delivery. On the other hand, the ionic unsaturated polyester containing the neutralized salt according to the present invention can give a satisfactory stability as stable as the anaerobic adhesives. Especially when the neutralized polyester is in the form of an alkali metal salt, a zinc-group metal (of the periodic table) salt, ammonium salt, an amine salt or mixtures thereof, the effect on the gelling stability is markedly exhibited.

Although the conventional two-part acrylic adhesives has some oily surface-adhesion properties, the neutralized ionic unsaturated polyester according to the present invention can enhance the affinity with oils and increase the oily surface-adhesion property.

Thus, the neutralized ionic unsaturated polyester having at least one polymerizable or copolymerizable double bond in its molecule, which is one of the essential components in the present invention, brings about the increase in adhesion performances and oily surface-adhesion properties as well as the provision of gelling stabilities. These unique excellent effects can not be observed in conventional adhesives. The amount of the neutralized polyester to be used is in the range of generally 0.2 to 30% and preferably 1 to 20% by weight of the liquids I and II. When the amount to be used in less than the above defined range, the resulting adhesive is not satisfactory in respect of the gelling stability and adhesion performances. When the amount is more than the above defined range, the increase in adhesion performance can not be expected and the unfavorable hydroscopic property is provided to some extent.

In the two-part adhesives of the present invention, it is sometimes possible to further enhance the stabilities by the synergistic use of a radical-polymerization inhibitor. Also, a small amount (i.e., 1% or less by weight of the liquids I and II) of paraffin wax can be used to enhance the surface curability of the adhesive.

If desired, it is also possible to add a plasticizer, fillers, a thickener and a pigment to the adhesive.

Although an elastomer containing no chlorosulfone group is used, the present invention has succeeded in providing a novel adhesive of high performances which is very good in adhesion strength and also excellent in the oily surface-adhesion property, storage stability, thermal resistance, and the like.

The present invention is further explained more specifically by way of the following examples and comparative examples, wherein all "parts" are by weight.

REFERENCE EXAMPLE 1

Preparation of the metal salt of unsaturated polyester

A reaction vessel equipped with a stirrer, a thermometer and a cooling tube was charged with 1 mol of ethylene glycol (62.1 g), 2 mols of maleic anhydride (196 g) and 1.2 g of hydroquinone (0.05% by weight of the total amount charged). The charged materials were subjected to reaction at 70° C. for 30 minutes followed by addition thereto of 0.25 mol of a metal compound selected from the compounds No. 1 through No. 3 shown in Table 1. The resulting mixture was then incorporated with 8 mols of maleic anhydride (785 g) and 11 mols of allyl glycidyl ether (1256 g) and subjected to reaction with stirring at 90° C. for 4 hours to obtain a homogeneous transparent metal salt of unsaturated polyester. The resulting salts are designated No. 1, No. 2 and No. 3, respectively.

REFERENCE EXAMPLE 2

Preparation of an ammonium or amine salt of unsaturated polyester

A reaction vessel as used above was charged with 1 mol of ethylene glycol (62.1 g), 10 mols of maleic anhydride (981 g), 11 mols of allyl glycidyl ether (1256 g), 1.2 g of hydroquinone and 2.4 g of trimethylbenzylammonium chloride. The mixture was subjected to reaction at 90° C. for 7 hours to obtain an unsaturated polyester having an acid value of 12.4. Then, ammonia or an amine selected from the compounds No. 4 through No. 8 shown in Table 1 was added thereto in an amount equivalent to the acid value of the polyester, to obtain a homogeneous transparent ammonium or amine salt of the unsaturated polyester. The salts are designated No. 4 through No. 8, respectively. In the case of the ammonium salt, ammonia was used as an aqueous 28% solution thereof, and water produced after neutralization was removed under reduced pressure.

TABLE 1

| | Type of the neutralizing agents and the acid values of the neutralized unsaturated polyester | |
|---|---|---|
| Nos. | Type of neutralizing agents | Acid values of neutralized polyesters |
| 1 | sodium carbonate | 1.4 |
| 2 | potassium carbonate | 0.9 |
| 3 | zinc oxide | 1.1 |
| 4 | ammonia | 1.2 |
| 5 | n-butyl amine | 0.9 |
| 6 | diethyl amine | 0.4 |
| 7 | ethylene diamine | 1.0 |
| 8 | triethylenetetramine | 0.5 |

EXAMPLE 1

Preparation of an adhesive base solution

An adhesive base solution was prepared by homogeneously dissolving 300 parts of methyl methacrylate, 150 parts of 2-hydroxypropyl methacrylate, 50 parts of nitrile rubber (trade name Nipol 1042 supplied by Nippon Geon K.K., Japan) and 0.15 part of paraffin wax.

Preparation of the liquid I

To 50 parts of the adhesive base solution prepared above were added 1 part of cumene hydroperoxide and 3 parts of the neutralized unsaturated polyester selected from the products No. 1 through No. 8 obtained in Reference Examples 1 and 2. The resulting mixtures were dissolved to obtain the liquids I-1 through I-8, respectively.

Preparation of the liquid II

To 50 parts of the adhesive base solution prepared above were added 0.25 part of vanadyl acetyl acetonate and 3 parts of the neutralized unsaturated polyester selected from the products No. 1 through No. 8 obtained in Reference Examples 1 and 2. The resulting mixtures were dissolved to obtain the liquids II-1 through II-8, respectively.

Then, the two-part adhesives consisting of one each of the liquid I and II compositions were subjected to adhesion tests to measure the properties thereof. The results are shown in Table 2. Incidentally, the measurements of the properties were conducted according to the following methods.

Measurement of adhesion strength

Approximately the same amounts of the liquid I and liquid II of the present adhesive compositions were coated on adherends, respectively. The coated surfaces of the adherends were put together, fixed and allowed to stand at 23° C. and 50% RH for 24 hours, followed by measurement of the strengths.

Tensile shear strength: according to ASTM D1002-64, the adherend being cold-rolled steel stock 1.6 mm thick, (lap length 12.5 mm).

Impact strength: according to ASTM D950-54, the adherend being rolled steel stock for general structures.

Measurement of setting time

Approximately the same amounts of the liquid I and liquid II were coated on the test pieces for tensile shear strength tests, respectively, and the coated surface were put together. The time required until the bonded adherends cannot be torn off by the hands was measured and recorded as the setting time.

Storage stability at 50° C.

One hundred (100) ml of the adhesive was put in a 100 ml polyethylene vessel and placed in a dryer at 50° C. The time required until the adhesive was thickened or gelled at 50° C. The present inventors have confirmed that the adhesive is stable at room temperature for 6 to 12 months or more if the adhesive is maintained without change for 10 days or more under the above-mentioned conditions.

No. 10) were prepared, followed by measurement of the properties. The results are shown in Table 3.

In the adhesive No. 9, an unsaturated polyester wherein remaining carboxyl groups were not neutralized was used instead of the neutralized unsaturated polyester according to the present invention as shown in Reference Examples 1 and 2. The liquids I and II were prepared in the following ways.

Liquid I: To 50 parts of the adhesive base solution obtained in Example 1 were added 1 part of cumene hydroperoxide and 3 parts of the unsaturated polyester having an acid value of 12.4 which had not been neutralized with ammonia or an amine as described in Reference Example 2. The mixture was dissolved to obtain the liquid I-9.

Liquid II: To 50 parts of the adhesive base solution obtained in Example 1 were added 0.25 part of vanadyl acetyl acetonate and 3 parts of the above mentioned unneutralized unsaturated polyester having an acid value of 12.4. The mixture was dissolved to obtain the liquid II-9.

The adhesive No. 10 is a conventionally known composition wherein no neutralized unsaturated polyester is used. The liquids I and II were prepared in the following manners.

Liquid I: To 50 parts of the adhesive base solution obtained in Example 1 was added 1 part of cumene hydroperoxide, followed by dissolution to obtain the liquid I-10.

Liquid II: To 50 parts of the adhesive base solution obtained in Example 1 was added 0.25 part of vanadyl acetyl acetonate, followed by dissolution to obtain the liquid II-10.

TABLE 3

| | combination of the liquids | | storage stability at 50° C. | | setting time (minutes) | tensile shear strength (Kg/cm²) | impart strength (Kg·cm/cm²) |
|---|---|---|---|---|---|---|---|
| Nos. | liquid I | liquid II | liquid I | liquid II | | | |
| 9 | I-9 | II-9 | 1 hour | >10 days | 6 | 242 | 21.1 |
| 10 | I-10 | II-10 | 1 hour | >10 days | 8 | 189 | 15.2 |

As clearly shown in Tables 2 and 3, in comparison with the adhesive No. 9 containing an unneutralized unsaturated polyester, the present two-part adhesives

TABLE 2

| | combination of the liquids | | Results of the adhesion tests | | | | |
|---|---|---|---|---|---|---|---|
| | | | storage stability at 50° C. | | setting time (minutes) | tensile shear strength (Kg/cm²) | impact strength (Kg·cm/cm²) |
| Nos. | liquid I | liquid II | liquid I | liquid II | | | |
| 1 | I-1 | II-1 | >10 days | >10 days | 8 | 253 | 24.9 |
| 2 | I-2 | II-2 | " | " | 9 | 272 | 24.4 |
| 3 | I-3 | II-3 | " | " | 10 | 241 | 21.0 |
| 4 | I-4 | II-4 | " | " | 8 | 245 | 23.2 |
| 5 | I-5 | II-5 | " | " | 9 | 261 | 21.8 |
| 6 | I-6 | II-6 | " | " | 9 | 257 | 22.9 |
| 7 | I-7 | II-7 | " | " | 10 | 236 | 20.2 |
| 8 | I-8 | II-8 | " | " | 10 | 248 | 20.9 |

COMPARATIVE EXAMPLE 1

For comparison with the results of Example 1, the following two-part adhesives (designated as No. 9 and (Nos. 1 through 8 in Table 2) wherein neutralized unsaturated polyesters were added exhibit the storage stabilities at 50° C. of the liquids I. Moreover, in comparison with the adhesive No. 10 containing no unsaturated polyester, the present adhesives are excellent in the storage stabilities at 50° C. of the liquids I as well as in the tensile shear strengths and impact strengths.

EXAMPLE 2, COMPARATIVE EXAMPLES 2 THROUGH 4

The following two-part adhesive was prepared, and the properties thereof were measured. The results are shown in Table 4. For comparison, the properties of the so-called second-generation acrylic adhesive containing a commercial chlorosulfonated polyethylene, a two-part epoxy based adhesive and a cyanocrylate based adhesive were measured. The results are also shown in Table 4.

Composition of the present two-part adhesive

The properties of the adhesives were measured according to the following methods.

Thermal deterioration test:

The test pieces for tensile shear testing were allowed to stand at 23° C. and 50% RH for 24 hours, heated to 150° C. for 250 hours, and then measured at 23° C.

Heat resistance test:

The test pieces for tensile shear testing were allowed to stand at 23° C. and 50% RH for 24 hours, and then subjected to measurement in a thermostatic chamber maintained at 80° C.

Adhesion property onto oily surfaces:

One surface of each test piece for tensile testing was coated with one of various oils at a coating weight of 2 to 3 g/m². The oil-coated surfaces were bonded together using an adhesive, allowed to stand at 23° C. and 50% RH, and then subjected to measurement.

TABLE 4

| | The properties thus measured | | | | | |
|---|---|---|---|---|---|---|
| | tensile shear strength under normal | tensile shear strength after thermal | tensile shear strength in the heat resistance | adhesion onto oily surfaces (Kg/cm²) | | |
| Type of adhesives | conditions (Kg/cm²) | deterioration (Kg/cm²) | test (Kg/cm²) | cutting oil | gear oil | spindle oil |
| the present adhesive of Example 2 | 279 | 352(126) | 120(43) | 285(102) | 273(98) | 257(92) |
| Comp. Ex. 2; commercial second-generation acrylic | 273 | 128(47) | 86(32) | 257(94) | 218(80) | 208(76) |
| Comp. Ex. 3; commercial two-part epoxy | 149 | 172(115) | 27(18) | 132(89) | 121(81) | 126(85) |
| Comp. Ex. 4; commercial cyanoacrylate | 115 | 0(0) | 74(64) | 7(6) | 53(46) | 53(46) |

(Note)
Comparative Example 2; an adhesive containing a chlorosulfonated polyethylene.
Comparative Example 3; the two liquids were mixed and then heat-cured.
The values in ( ) represent a retention ratio of the shear strength on the basis that the shear strength under normal conditions is 100.

| Liquid I | | Liquid II | |
|---|---|---|---|
| Components | Parts | Components | Parts |
| methyl methacrylate | 210 | methyl methacrylate | 210 |
| 2-hydroxypropyl methacrylate | 210 | 2-hydroxypropyl methacrylate | 210 |
| nitrile rubber (trade name Nipol 1042) | 70 | nitrile rubber (trade name Nipol 1042) | 70 |
| potassium salt of unsaturated polyester in Table 1, No. 2 | 10 | potassium salt of unsaturated polyester in Table 1, No. 2 | 10 |
| polymethylmethacrylate | 5 | polymethylmethacrylate | 5 |
| paraffin wax | 1.5 | paraffin wax | 1.5 |
| cumene hydroperoxide | 15 | vanadyl acetyl acetonate | 2.5 |

As clear from Table 4, in comparison with the adhesives of Comparative Examples 2 through 4, it can be appreciated that the present two-part adhesive is excellent in adhesion properties and especially in the heat resistance and adhesion onto oily surfaces.

REFERENCE EXAMPLE 3

Preparation of potassium salts of unsaturated polyesters

The potassium salts of unsaturated polyesters No. 13 and No. 14 were prepared in the same manner as in Reference Example 1 by using the materials and employing the molar ratios of the charged materials which were shown in Table 5. In the same way, the potassium salts of saturated polyesters (No. 15 and No. 16) which contained no polymerizable or copolymerizable double bonds were also prepared for comparative uses.

TABLE 5

| materials molar ratios of charged materials | ethylene glycol 1 | potassium carbonate 0.3 | anhydride of dibasic acid 10 | monoepoxy compound 10.5 | acid values of the resulting potassium salt of polyester |
|---|---|---|---|---|---|
| No. 13 | ethylene glycol | potassium carbonate | succinic anhydride | glycidyl methacrylate | 2.4 |
| No. 14 | " | " | tetrahydrophthalic anhydride | allylglycidyl ether | 3.1 |
| No. 15 | " | " | phthalic anhydride | phenylglycidyl ether | 6.1 |

TABLE 5-continued

| materials molar ratios of charged materials | ethylene glycol 1 | potassium carbonate 0.3 | anhydride of dibasic acid 10 | monoepoxy compound 10.5 | acid values of the resulting potassium salt of polyester |
|---|---|---|---|---|---|
| No. 16 | " | " | hexahydro-phthalic anhydride | propylene oxide | 3.8 |

EXAMPLE 3, REFERENCE EXAMPLES 5 & 6

Preparation of an adhesive base solution

An adhesive base solution was prepared by homogeneously dissolving 250 parts of methyl methacrylate, 120 parts of 2-hydroxyethyl methacrylate, 50 parts of nitrile rubber (trade name Nipol 1041 supplied by Nippon Geon K.K., Japan) and 0.84 part of paraffin wax.

Preparation of the liquid I

To 50 parts of the adhesive base solution prepared above were added 1 part of cumene hydroperoxide and 2 parts of a potassium salt selected from the unsaturated polyester salts No. 13 and No. 14 according to the present invention and the saturated polyester salts No. 15 and No. 16 used for comparison, which had been prepared in Reference Example 3. The resulting mixtures were dissolved to obtain the liquids I-13 through I-16, respectively.

Preparation of the liquid II

To 50 parts of the adhesive base solution prepared above were added 0.5 part of dibutyl thiourea, 0.2 part of manganese naphthenate, and 2 parts of a potassium salt selected from the unsaturated polyester salts No. 13 and No. 14 according to the present invention and the saturated polyester salts No. 15 and No. 16 used for comparison, which had been prepared in Reference Example 3. The resulting mixtures were dissolved to obtain the liquids II-13 through II-16, respectively.

Then, the two-part adhesives consisting of the liquids I and II were subjected to adhesion tests to measure the properties thereof. The results are shown in Table 6.

TABLE 6

| | combination of the liquids | | storage stability at 50° C. | | setting time (minutes) | tensile shear strength (Kg/cm²) | impact strength (Kg·cm/cm²) |
|---|---|---|---|---|---|---|---|
| Nos. | liquid I | liquid II | liquid I | liquid II | | | |
| No. 13 | I-13 | II-13 | >10 days | >10 days | 6 | 268 | 24.7 |
| No. 14 | I-14 | II-14 | " | " | 7 | 254 | 20.6 |
| Comp. Ex. 5 No. 15 | I-15 | II-15 | " | " | 13 | 159 | 14.2 |
| Comp. Ex. 6 No. 16 | I-16 | II-16 | " | " | 15 | 200 | 11.5 |

As clear from Table 6, in comparison with the adhesives of Comparative Examples 5 and 6 containing the potassium salts of saturated polyesters, the present two-part adhesives wherein the potassium salts of unsaturated polyesters were incorporated exhibit a shorter setting time and also are very excellent in the tensile shear strength and impact strength, although their storage stabilities at 50° C. do not make a large difference.

What is claimed is:

1. A two-part type adhesive composed of liquid I comprising components (a), (b) and (c) set forth below and liquid II comprising components (a), (c) and (d) set forth below, (a) acrylic monomer 40 to 90%
(b) organic peroxide 0.5 to 20%
(c) nitrile rubber 2 to 50%
(d) curing accelerator 0.05 to 10%, liquid I or both liquids I and II further containing 0.2 to 30% of an ion-containing unsaturated polyester represented by the general formula

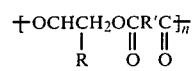

wherein R represents hydrogen, alkyl of 1 or 2 carbon atoms,

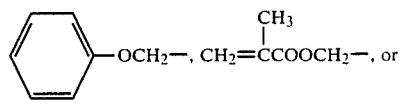

$$CH_2=CHCH_2OCH_2-;$$

R' represents a dibasic acid residue; and n is an integer of 4 to 20; at least one of said R and R' having a polymerizable or copolymerizable double bond, and the remaining carboxy group of said polyester being neutralized by an alkali metal, ammonia or an amine or mixtures thereof; the percentages set forth above all being by weight based on the weight of liquids I and II.

2. The two-part type adhesive according to claim 1, wherein the acrylic monomer is methyl methacrylate, 2-hydroxyethyl methacrylate, 2-hydroxypropyl methacrylate or a mixture thereof.

3. The two-part type adhesive according to claim 1, wherein the organic peroxide is cumene hydroperoxide.

4. The two-part type adhesive according to claim 1, wherein the curing accelerator is vanadyl acetylacetonate.

5. The two-part type adhesive according to claim 1, wherein R' is the residue of maleic acid, succinic acid, phthalic acid, tetrahydrophthalic acid or hexahydrophthalic acid.

6. A two-part type adhesive composed of liquid I comprising components (a), (b) and (c) set forth below and liquid II comprising components (a), (c) and (d) set forth below;
(a) acrylic monomer 40 to 90%
(b) organic peroxide 1 to 10%
(c) nitrile rubber 2 to 50%
(d) curing accelerator 0.2 to 5%, liquid I or both liquids I and II further containing 1 to 20% of an ion-containing unsaturated polyester represented by the general formula

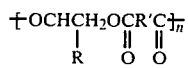

wherein R represents hydrogen, alkyl of 1 ot 2 carbon atoms,

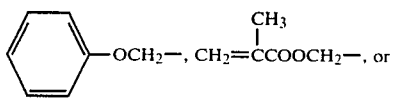

$CH_2=CHCH_2OCH_2-$;

R' represents a dibasic acid residue; and n is an integer of 4 to 20; at least one of said R and R' having a polymerizable or copolymerizable double bond, and the remaining carboxy group of said polyester being neutralized by an alkali metal, ammonia or an amine or mixtures thereof; the percentages set forth above all being by weight based on the weight of liquids I and II.

7. The two-part type adhesive according to claim 6, wherein the acrylic monomer is methyl methacrylate, 2-hydroxyethyl methacrylate, 2-hydroxypropyl methacrylate or a mixture thereof.

8. The two-part type adhesive according to claim 6, wherein the organic peroxide is cumene hydroperoxide.

9. The two-part type adhesive according to claim 6, wherein the curing accelerator is vanadyl acetylacetonate.

10. The two-part type adhesive according to claim 6, wherein R' is the residue of maleic acid, succinic acid, phthalic acid, tetrahydrophthalic acid or hexahydrophthalic acid.

* * * * *